(12) United States Patent
Williams et al.

(10) Patent No.: US 11,826,687 B2
(45) Date of Patent: *Nov. 28, 2023

(54) CONE AIR FILTER

(71) Applicant: K&N Engineering, Inc., Riverside, CA (US)

(72) Inventors: Steve Williams, Cherry Valley, CA (US); Jere James Wall, Helendale, CA (US)

(73) Assignee: K&N Engineering, Inc., Riverside, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/531,531

(22) Filed: Nov. 19, 2021

(65) Prior Publication Data

US 2022/0118390 A1 Apr. 21, 2022

Related U.S. Application Data

(63) Continuation of application No. 16/860,424, filed on Apr. 28, 2020, now Pat. No. 11,179,664, which is a
(Continued)

(51) Int. Cl.
  *B01D 46/00* (2022.01)
  *B01D 46/24* (2006.01)
  (Continued)

(52) U.S. Cl.
  CPC ..... *B01D 46/2414* (2013.01); *B01D 46/0001* (2013.01); *B01D 46/0005* (2013.01);
  (Continued)

(58) Field of Classification Search
  CPC ...... B01D 29/88; B01D 29/906; B01D 46/24; B01D 46/52; B01D 46/521;
  (Continued)

(56) References Cited

U.S. PATENT DOCUMENTS 562,331 A 6/1896 Laing
4,004,899 A 1/1977 Giacovas
(Continued)

FOREIGN PATENT DOCUMENTS

GB 2 420 511 5/2006

*Primary Examiner* — Minh Chau T Pham
(74) *Attorney, Agent, or Firm* — Rutan & Tucker LLP; Hani Z. Sayed

(57) ABSTRACT

An apparatus and method are provided for a cone air filter for a closed intake system of an internal combustion engine. The cone air filter is comprised of a cone-shaped filter medium, retained between a base and a cap, that is fabricated to remove contaminants and particulate matter from an intake airstream. The base is comprised of a flange that couples with an air intake duct of the internal combustion engine. A shell receiver is incorporated into the base and receives a rigid exterior shell, such that the exterior shell surrounds the cone air filter and directs the intake airstream therein. A cap is disposed on an apex portion of the cone air filter and is configured to direct the intake airstream around the apex portion and into the cone-shaped filter medium.

16 Claims, 2 Drawing Sheets

Related U.S. Application Data continuation of application No. 15/666,353, filed on Aug. 1, 2017, now Pat. No. 10,661,215.

(60) Provisional application No. 62/370,525, filed on Aug. 3, 2016.

(51) Int. Cl.
*B01D 46/52* (2006.01)
*F02M 35/04* (2006.01)
*F02M 35/024* (2006.01)

(52) U.S. Cl.
CPC ....... *B01D 46/0043* (2013.01); *B01D 46/521* (2013.01); *F02M 35/02408* (2013.01); *F02M 35/02425* (2013.01); *F02M 35/02483* (2013.01); *B01D 2265/06* (2013.01); *B01D 2275/201* (2013.01); *B01D 2279/60* (2013.01)

(58) Field of Classification Search
CPC ............ B01D 46/2414; B01D 46/0005; B01D 46/0001; B01D 46/0043; B01D 50/00; B01D 50/002; B01D 2275/201; B01D 2201/02; B01D 2201/291; B01D 2265/028; B01D 2265/06; B01D 2273/60; F02M 35/02425; F02M 35/02408; F02M 35/02483

USPC ......... 55/337, 498, 503, 505, 507, 521, 529, 55/385.3, 517, 510; 95/268; 123/198 E, 123/593

See application file for complete search history.

(56) References Cited

U.S. PATENT DOCUMENTS

| | | | |
|---|---|---|---|
| 5,106,397 | A | 4/1992 | Jaroszczyk et al. |
| 6,319,298 | B1 * | 11/2001 | Ng-Gee-Quan ... B01D 46/2403 55/331 |
| 6,833,023 | B1 | 12/2004 | Vandenberghe et al. |
| 7,452,395 | B2 | 11/2008 | Fiello et al. |
| 10,661,215 | B2 * | 5/2020 | Williams ......... F02M 35/02408 |
| 11,179,664 | B2 * | 11/2021 | Williams ............. B01D 46/521 |
| 2007/0012005 | A1 | 1/2007 | Huang |
| 2011/0265434 | A1 | 11/2011 | Polizzi et al. |
| 2015/0176491 | A1 | 6/2015 | Alnafisah |
| 2015/0314227 | A1 * | 11/2015 | Williams ........... B01D 46/0035 427/244 |
| 2018/0209384 | A1 * | 7/2018 | Williams ........... B01D 46/2403 |

* cited by examiner

CONE AIR FILTER

PRIORITY

This application claims the benefit of and priority to U.S. patent application Ser. No. 16/860,424 filed Apr. 28, 2020, now U.S. Pat. No. 11,179,664 and U.S. patent application Ser. No. 15/666,353 filed on Aug. 1, 2017, now issued U.S. Pat. No. 10,661,215 on May 26, 2020 and U.S. Provisional Application, entitled "Cone Air Filter," filed on Aug. 3, 2016 and having application Ser. No. 62/370,525

FIELD

The field of the present disclosure generally relates to filtration devices. More particularly, the field of the present disclosure relates to an apparatus and a method for a cone air filter for a closed intake system of an internal combustion engine.

BACKGROUND

An air filter designed to remove particulate matter from an airstream generally is a device comprising fibrous materials. These fibrous materials may remove solid particulates such as dust, pollen, mold, and bacteria from the airstream. Air filters are used in applications where air quality is important, notably in building ventilation systems and with engines.

Air filters may be used in automobiles, trucks, tractors, locomotives and other vehicles that use internal combustion engines. Air filters may be used with gasoline engines, diesel engines, or other engines that utilize fossil fuels or other combustible substances. Air filters may be used with engines in which combustion is intermittent, such as four-stroke and two-stroke piston engines, as well as other types of engines that take in air continuously so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally, the air filters used with internal combustion engines and compressors tend to be comprised of either: paper, foam, or cotton filters. Some filters use an oil bath. Air filters for internal combustion engines prevent abrasive particulate matter from entering the engine's cylinders, where it would cause mechanical wear and oil contamination. In many fuel injected engines, a flat panel pleated paper filter element may be used. This filter is usually placed inside a plastic box connected to the throttle body with ductwork. Vehicles that use carburetors or throttle body fuel injection typically use a cylindrical air filter positioned above the carburetor or throttle body.

SUMMARY

An apparatus and method are provided for a cone air filter for a closed intake system of an internal combustion engine. The cone air filter is comprised of a cone-shaped filter medium that is retained between a base and a cap. The cone-shaped filter medium is fabricated to remove contaminants and particulate matter from an intake airstream. The filter medium may be comprised of paper, foam, cotton, spun fiberglass, or other known filter materials, woven or non-woven materials, synthetic or natural, or any combination thereof. A filter oil composition may be applied to the filter medium so as to enhance air cleaning properties of the cone air filter. The base is comprised of a flange that is configured to couple with an air intake duct of the internal combustion engine. A shell receiver is incorporated into the base and configured to receive a rigid exterior shell, such that the exterior shell surrounds the cone air filter and directs the intake airstream therein. A cap is disposed on an apex portion of the cone air filter and is configured to direct the intake airstream around the apex portion and into the cone-shaped filter medium.

In an exemplary embodiment, a cone air filter for a closed intake system of an internal combustion engine comprises a base comprised of a flange that is configured to couple with an air intake duct of the internal combustion engine; a cap comprising an apex portion of the cone air filter and configured to direct an intake airstream into the cone air filter; and a filter medium disposed between the base and the cap, the filter medium being configured to remove contaminants and particulate matter from the intake airstream entering the air intake duct.

In another exemplary embodiment, a the cone air filter is configured to be retained within a rigid exterior shell comprising the closed intake system, such that the intake airstream is directed between the cap and an interior of the exterior shell, drawn through the filter medium into an interior of the cone air filter, the contaminants and particulate matter being removed from the intake airstream by the filter medium, and drawn into the air intake duct to the internal combustion engine. In another exemplary embodiment, the cap is comprised of a rounded, cone-shaped member fixedly coupled to an apex portion of the filter medium that is opposite of the base. In another exemplary embodiment, the cap is comprised of a rigid material suitable for withstanding the temperature and pressure within the closed intake system, the cap being configured to direct the intake airstream around the apex portion and into the side of the filter medium.

In another exemplary embodiment, the base includes a shell receiver that is configured to receive a rigid exterior shell that directs the intake airstream into the filter medium, the shell receiver being comprised of a smooth circumferential surface disposed at an extreme diameter of the base. In another exemplary embodiment, the shell receiver is comprised of one or more holes that are configured to receive fasteners suitable for fixedly coupling the exterior shell with the smooth circumferential surface. In another exemplary embodiment, the one or more holes are comprised of four holes that are disposed uniformly around the perimeter of the smooth circumferential surface. In another exemplary embodiment, the base includes a vent inlet receiver configured to receive a vent inlet, such that the vent inlet is placed into fluid communication with an interior of the cone filter. In another exemplary embodiment, the vent inlet is comprised of a flange adapter configured to couple the interior of the cone filter with any of a PCV valve, a crankcase breather, and various sensors that are electrically connected with the internal combustion engine.

In another exemplary embodiment, the flange is comprised of a pliable material amendable to being stretched and compressed so as to be coupled with sizes of the air intake duct that are, respectively, slightly greater than or lessor than a relaxed interior diameter of the flange. In another exemplary embodiment, the flange is configured to slide onto an exterior of the air intake duct and be retained thereon by way of a suitable clamp or any other similar fastener. In another exemplary embodiment, the flange is configured to receive an adaptor into an interior of the flange, the adaptor being configured to be coupled with the air intake duct so as to communicate the intake airstream from the interior of the cone air filter to the air intake duct.

In another exemplary embodiment, the filter medium is comprised of paper, foam, cotton, spun fiberglass, or other known filter materials, woven or non-woven materials, synthetic or natural, or any combination thereof. In another exemplary embodiment, the filter medium is pleated or otherwise shaped or contoured to increase a surface area for passing the intake airstream to be cleaned. In another exemplary embodiment, the filter medium is configured to be treated with a filter oil composition so as to enhance air cleaning properties of the filter medium.

In another exemplary embodiment, a wire support is incorporated into the filter medium so as to provide additional strength and durability to the cone air filter. In another exemplary embodiment, the filter medium is positioned between the wire support and one or more layers of a reinforcing material. In another exemplary embodiment, the wire support comprises a wire screen positioned on an outer surface and a wire screen positioned on an inner surface of the filter medium. In another exemplary embodiment, the wire screens are comprised of powder-coated aluminum screen wire that is co-pleated along with the filter medium so as to reinforce the cone air filter.

In an exemplary embodiment, a method for a cone air filter for a closed intake system of an internal combustion engine comprises configuring a base that is comprised of a flange that couples with an air intake duct of the internal combustion engine; incorporating a shell receiver into the base that receives a rigid exterior shell, such that the exterior shell directs the intake airstream into the cone air filter; forming a cap on an apex portion of the cone air filter to direct an intake airstream into the cone air filter; fabricating a cone-shaped filter medium to remove contaminants and particulate matter from the intake airstream; and retaining the filter medium between the base and the cap.

BRIEF DESCRIPTION OF THE DRAWINGS

The drawings refer to embodiments of the present disclosure in which.

Figure 1:
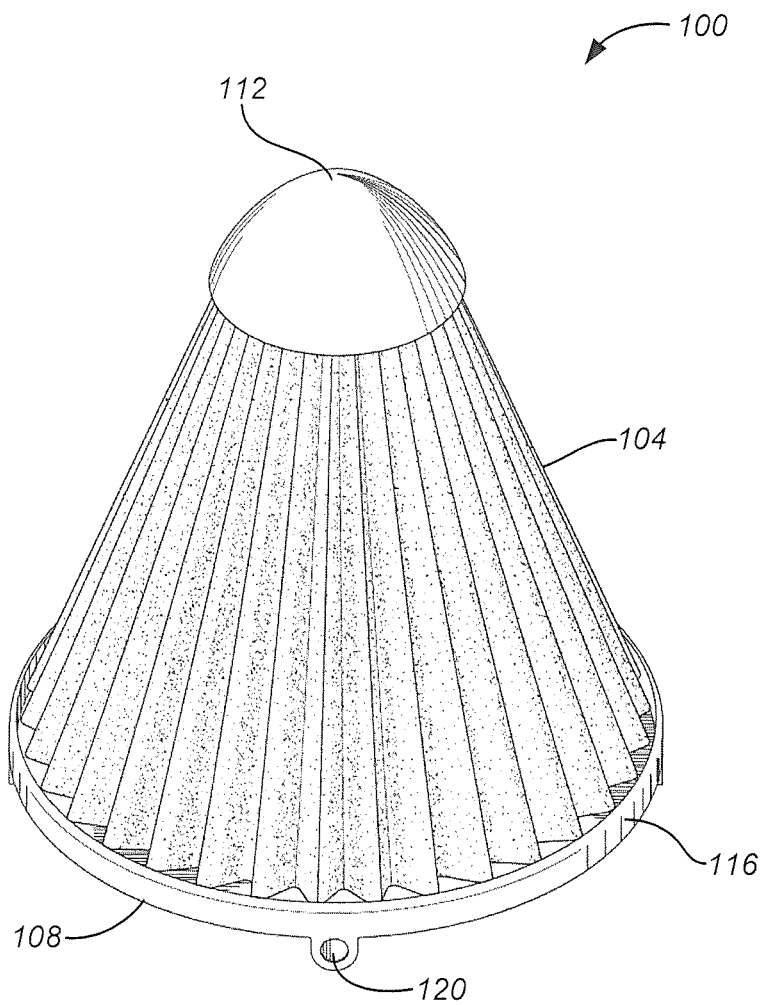
FIG. 1 illustrates an upper perspective view of an exemplary embodiment of a cone air filter comprising a cap that covers an apex portion of the cone air filter.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first flange," may be made. However, the specific numeric reference should not be interpreted as a literal sequential order but rather interpreted that the "first flange" is different than a "second flange." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for a cone air filter for a closed intake system of an internal combustion engine. The cone air filter is configured to be retained within a rigid exterior shell comprising the closed intake system, such that an intake airstream within an interior of the exterior shell is drawn through a filter medium into an interior of the cone air filter. Contaminants and particulate matter are removed from the intake airstream by the filter medium before the intake airstream is drawn into an air intake duct to the internal combustion engine. The filter medium may be comprised of paper, foam, cotton, spun fiberglass, or other known filter materials, woven or non-woven materials, synthetic or natural, or any combination thereof. A filter oil composition preferably is applied to the filter medium so as to enhance air cleaning properties of the cone air filter. A base of the cone air filter includes a flange that is configured to couple with the air intake duct of the internal combustion engine. A cap comprising an apex portion of the cone air filter is configured to direct the intake airstream around the apex portion and into the filter medium.

Although embodiments of the invention may be described and illustrated herein in terms of a cone air filter, it should be understood that embodiments of this invention are not limited to the exact shape illustrated, but rather may include a wide variety of generally enclosed shapes, such as cylindrical, circular, oval, round, curved, conical, or any other closed perimeter shape, that provide a relatively large surface area in a given volume of the filter. Moreover, embodiments as described herein are not limited to use as internal combustion engine filters, but rather may have applicability in other filtration systems in which a large volume of air needs to be treated.

FIG. 1 illustrates an upper perspective view of an exemplary embodiment of a cone air filter 100 configured for use within a closed intake system of an internal combustion engine. The cone air filter 100 is comprised of a filter medium 104 disposed between a base 108 and a cap 112. The cone air filter 100 is configured to be retained within a rigid exterior shell comprising the closed intake system, such that an intake airstream is directed between the cap 112 and an interior of the exterior shell, drawn through the filter medium 104 into an interior of the cone air filter 100, and drawn into an air intake duct to the internal combustion engine. The filter medium 104 is configured to remove contaminants and particulate matter from the intake airstream that is drawn into the air intake duct. The filter medium 104 is a generally cone-shaped member comprised of an apex portion that is fixedly coupled with the cap 112, and a base portion that is affixed to the base 108. The cap 112 serves to direct the intake airstream around the apex portion of the cone air filter and into the filter medium 104. It is contemplated that the cap 112 is comprised of a rigid material suitable for withstanding the temperature and pressure within the closed intake system.

The base 108 includes a shell receiver 116 that is configured to receive an interior of the rigid exterior shell, such that the exterior shell surrounds the cone air filter 100 and directs the intake airstream into the filter medium 104, as described above. The shell receiver 116 is comprised of a generally smooth circumferential surface disposed at an extreme diameter of the base 108. One or more holes 120 comprising the shell receiver 116 are configured to receive fasteners suitable for fixedly coupling the exterior shell with the smooth circumferential surface. In the embodiment illustrated in FIG. 1, the shell receiver 116 is comprised of four holes 120 that are disposed uniformly along the smooth circumferential surface around the perimeter of the base 108.

Figure 2:
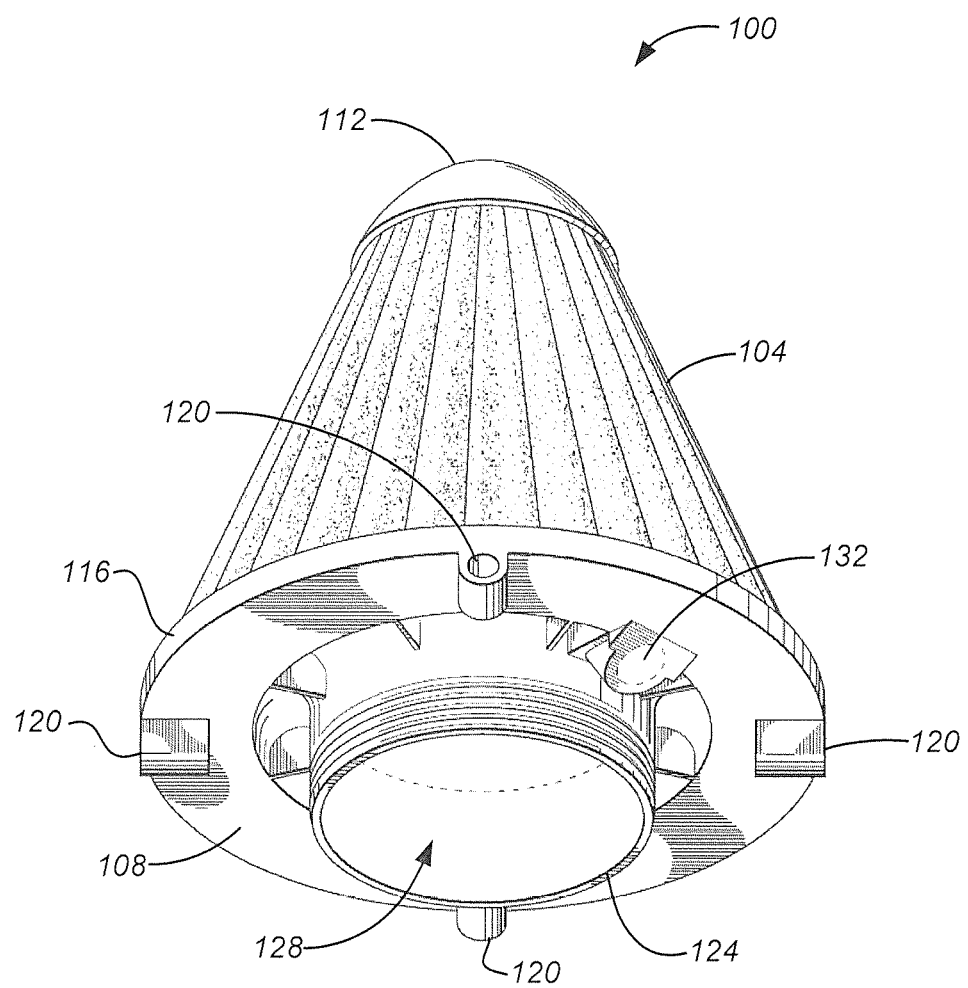
FIG. 2 illustrates a lower perspective view of an exemplary embodiment of a cone air filter comprising a base configured to be coupled with an air intake of an internal combustion engine.

As best shown in FIG. 2, the base 108 is comprised of a flange 124 that is configured to couple with an air intake duct of the internal combustion engine. The flange 124 may be comprised of a pliable material amendable to being stretched and compressed so as to be coupled with sizes of the air intake duct that are, respectively, slightly greater than or lessor than a relaxed interior diameter of an opening 128 of the flange 124. In some embodiments, the flange 124 may be configured to slide onto an exterior of the air intake duct and be retained thereon by way of a suitable clamp or any other similar fastener. In some embodiments, the flange 124 may be configured to receive an adaptor into the opening 128 of the flange 124. It is contemplated that the adaptor may be configured to be coupled with the air intake duct so as to communicate the intake airstream from the interior of the cone air filter 100 to the air intake duct.

Moreover, the base 108 includes a vent inlet receiver 132 that is configured to enable a practitioner of the cone air filter 100 to install a vent inlet, such that the vent inlet is placed into fluid communication with an interior of the cone air filter. For example, the vent inlet may be comprised of a flange adapter configured to couple the interior of the cone air filter 100 with any of a PCV valve, a crankcase breather, and various sensors that are electrically connected with the internal combustion engine. In some embodiments, the vent inlet receiver 132 may include a multiplicity of threads that are configured to threadably engage with substantially similar threads disposed on an exterior of the vent inlet. In some embodiments, wherein the vent inlet may be omitted, a plug may be threadably installed into the vent inlet receiver 132 in lieu of the flange adapter.

As mentioned above, the filter medium 104 provides an area to pass the intake airstream and entrap particulates and other contaminates flowing with the intake airstream. The filter medium 104 may be comprised of paper, foam, cotton, spun fiberglass, or other known filter materials, woven or non-woven materials, synthetic or natural, or any combination thereof. The filter medium 104 may be pleated, or otherwise shaped, or contoured so as to increase a surface area for passing the intake airstream to be cleaned. The length of the filter medium 104 in the circumferential direction may be longer than the circular circumference of the cone air filter 100 generally, such that the surface area of the filter medium 104 is greater than the profile surface area of the cone air filter 100.

In some embodiments, a wire support may be incorporated into the filter medium 104 so as to provide additional strength and durability to the cone air filter 100. For example, the filter medium 104 may be positioned between the wire support and one or more layers of a reinforcing material. The wire support may be comprised of wire screens positioned on an outer surface and an inner surface of the filter medium 104. In some embodiments, the filter medium 104 may be comprised of 4 to 6 layers of cotton gauze that are sandwiched between two epoxy-coated aluminum wire screens. It is contemplated that the wire screens may be co-pleated along with the filter medium 104 so as to reinforce the cone air filter 100. Further, the cotton gauze may be advantageously treated with a suitably formulated filter oil composition that causes tackiness throughout microscopic strands comprising the filter medium 104. The nature of the cotton allows high volumes of airflow, and when combined with the tackiness of the filter oil composition creates a powerful filtering medium which ensures a high degree of air filtration. Further details about components comprising the filter medium 104, as well as details about the filter oil composition, are disclosed in U.S. patent application Ser. No. 14/181,678, entitled "Air Box With Integrated Filter Media," filed on Feb. 16, 2014, and U.S. patent application Ser. No. 14/701,163, entitled "Filter Oil Formulation," filed on Apr. 30, 2015, the entirety of each of which is incorporated herein by reference.

It is contemplated that a practitioner of the cone air filter 100 may periodically clean the filter medium 104 rather than discarding the entire cone air filter, as is done with conventional air filters. In one embodiment, a cleaning method may be comprised of removing the intake air duct from the flange 124, and then removing any air ducting that is coupled with the rigid exterior shell housing the cone air filter 100. Thus, the rigid exterior shell and cone air filter 100 may be removed together from the closed intake system. The practitioner may clean the cone air filter 100 while coupled with the rigid exterior shell, or the cone air filter may be first removed from the rigid exterior shell before being cleaned. In some embodiments, a method for cleaning the filter medium 104 may be comprised of inserting a water hose through the opening 128 into the interior of the cone air filter 100 and then spraying water so as to flush contaminants from the filter medium 104. In some embodiments, the method for cleaning the cone air filter 100 may be comprised of utilizing a high pressure air hose in lieu of the water hose. In some embodiments, the method for cleaning the cone air filter 100 may be comprised of spraying water onto the exterior of the filter medium 104, such that the water and contaminants are flushed directly from the exterior of the filter medium 104, as well as exiting through the opening 128. Other cleaning methods will be apparent to those skilled in the art without deviating from the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An air filter for filtering an airstream into an internal combustion engine, comprising:
   a filter medium for filtering the airstream;
   a shell receiver for receiving a rigid exterior shell that directs the airstream into the filter medium;
   a flange for directing the airstream into an air intake duct of the internal combustion engine; and
   a cap for enclosing the filter medium.

2. The air filter of claim 1, wherein a base of the air filer comprises: the flange; the shell receiver; and a vent inlet receiver.

3. The air filter of claim 2, wherein the shell receiver comprises a smooth circumferential surface disposed at a periphery of the base.

4. The air filter of claim 3, wherein the shell receiver includes one or more holes for receiving fasteners for fixedly coupling the rigid exterior shell with the smooth circumferential surface.

5. The air filter of claim 2, wherein the vent inlet receiver is configured to receive a vent inlet that is placed into fluid communication with an interior of the air filter.

6. The air filter of claim 2, wherein the vent inlet comprises a flange adapter configured to couple the interior of the air filter with any of a PCV valve, a crankcase breather, and various sensors that are electrically connected with the internal combustion engine.

7. The air filter of claim 2, wherein the flange is configured to be coupled with sizes of the air intake duct that are slightly greater than or lessor than a relaxed interior diameter of the flange.

8. The air filter of claim 7, wherein the flange is configured to slide onto an exterior of the air intake duct and be retained thereon by way of a suitable clamp or any other similar fastener.

9. The air filter of claim 7, wherein the flange is configured to receive an adaptor configured to be coupled with the air intake duct.

10. The air filter of claim 1, wherein the filter medium is configured with a cone-shape that extends from a larger diameter near a base of the air filter to a smaller diameter near an apex of the air filter.

11. The air filter of claim 10, wherein the cap comprises a rounded, cone-shaped member configured to fixedly couple with an apex portion of the air filter.

12. The air filter of claim 1, wherein the filter medium is configured to be treated with a filter oil composition configured to cause tackiness of the filter medium.

13. The air filter of claim 12, wherein the filter oil composition comprises any one or more of paraffinic oil, polyalphaolefin, and a dye.

14. The air filter of claim 12, wherein the filter oil composition is configured to wick into the filter medium.

15. The air filter of claim 12, wherein the filter medium is configured to be flushed free of the filter oil composition and contaminants.

16. The air filter of claim 15, wherein the filter oil composition is configured to be removed from the filter medium by way of a solvent and flushing with water.

* * * * *